July 13, 1943.  H. E. KITCHEN ET AL  2,324,003
DOUBLE HELICAL GEAR CUTTER
Filed Dec. 30, 1938  2 Sheets-Sheet 2
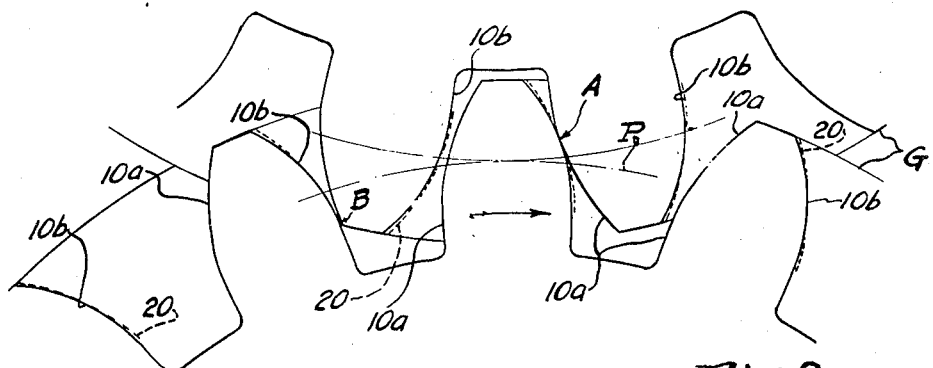
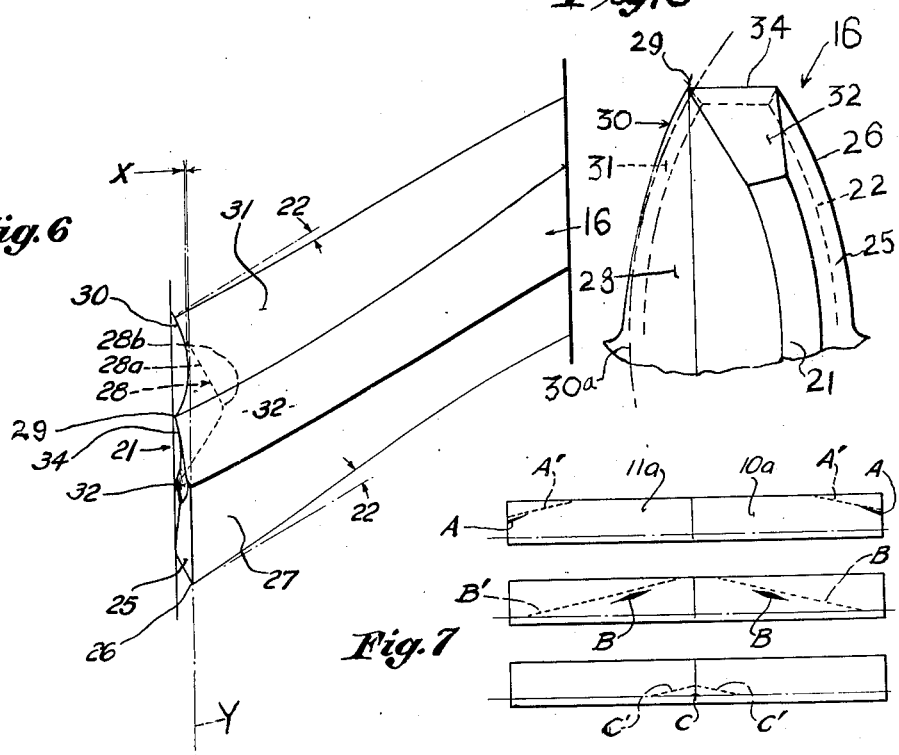
INVENTOR
Harry E. Kitchen
Gustave H. Hedman
BY
Albert R. Henry
ATTORNEY Patented July 13, 1943

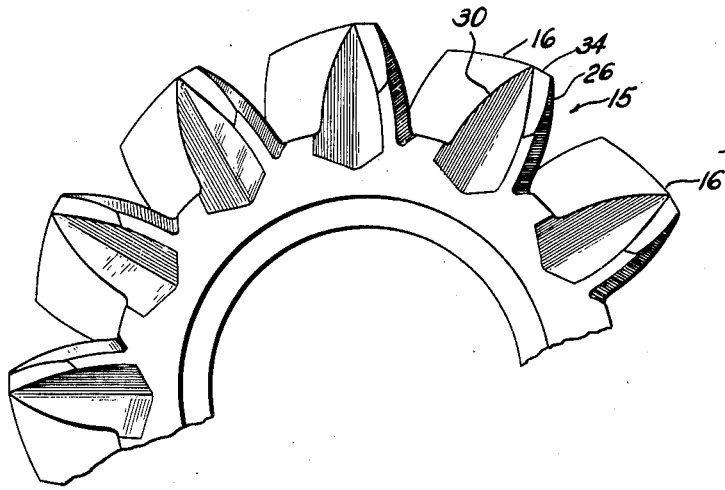
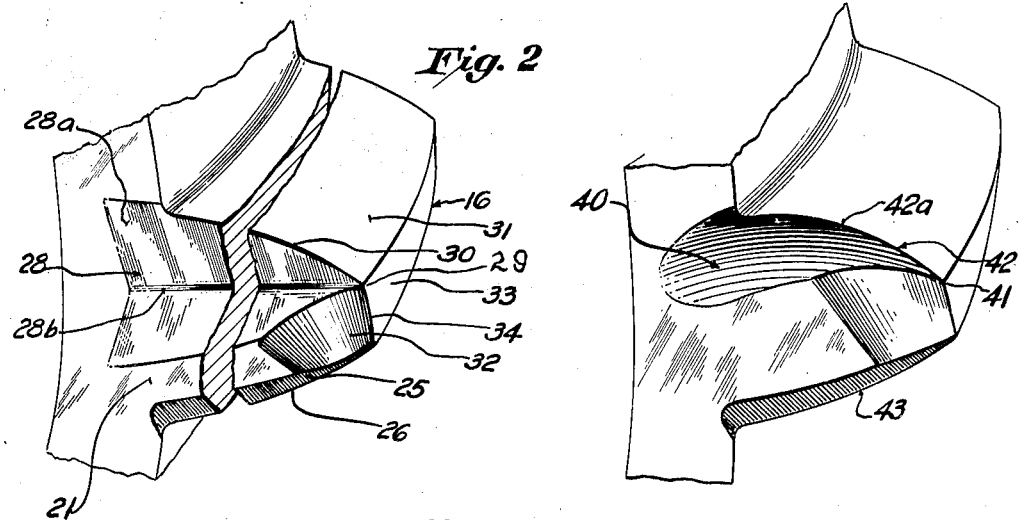
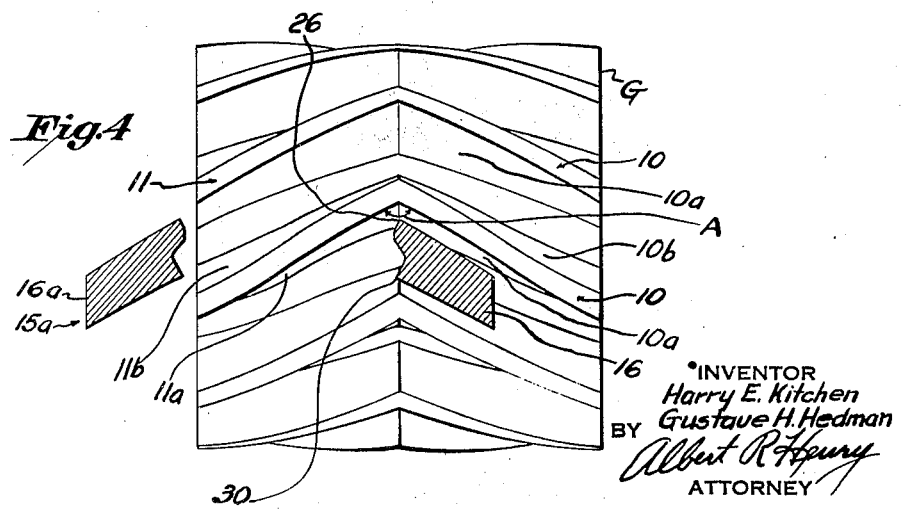

2,324,003

UNITED STATES PATENT OFFICE 2,324,003

DOUBLE HELICAL GEAR CUTTER

Harry E. Kitchen, Buffalo, and Gustave H. Hedman, Kenmore, N. Y., assignors to Farrel-Birmingham Company, Inc., Buffalo, N. Y.

Application December 30, 1938, Serial No. 248,460

5 Claims. (Cl. 29—103)

This invention relates to the shaping of gears by the molding-generating process, and more specifically it is directed to a novel pinion type cutter for producing improved forms of Sykes type double helical gears.

In the practice of this method, constant improvements in mechanism and precision checking has made it possible to produce consistently gears of great accuracy. This in turn has permitted a more thorough study and selection of gear forms best suited for quietness and durability. For example, it has been observed that due to stress and lubricaitng phenomena, a discrepancy of as little as .0002 inch falling outside of a true involute tooth contour will cause appreciable noise. It has also become apparent, even in this extremely rugged type of tooth structure, that operating stresses cause sufficient tooth deflection to cause improper operation of gears which were cut to the closest approach to perfect involute shapes.

In the present invention it is proposed, through the use of a novel cutter, to deviate deliberately from the true involute on one tooth flank, in order to compensate for tooth deflection and compression when the gears are running under normal loads, and to insure under these conditions that tooth loading will be uniform and the operation consequently quiet. Inasmuch as one herringbone gear may mesh with another in only one manner, this practice insures the contact of a true involute flank on one gear with a modified involute flank on the companion gear.

The invention therefore relates to an improved cutter for producing Sykes type herringbone gears, and it also relates to a tooth profile improvement in this type of gear. The invention will also be found to reside in a novel arrangement of cutting edges and associated structure of the cutter teeth with the dual object of adding strength to the cutter and of permitting accurate re-sharpening in the simplest manner.

These and other features of the invention will be more specifically set forth in the accompanying specification and drawings, wherein:

Fig. 1 is a fragmentary view of the improved cutter;

Fig. 2 is an enlarged perspective view of one tooth of the cutter;

Fig. 3 is a similar perspective view of a further embodiment of the invention;

Fig. 4 is a top view of a Sykes type gear, showing diagrammatically the teeth of opposing cutters in operation thereon;

Fig. 5 is an enlarged diagrammatic view showing the meshing action of two herringbone gears;

Fig. 6 is a top view of one of the cutter teeth of Fig. 1;

Fig. 7 is a diagrammatic view showing the lines of contact between active teeth during load conditions.

Fig. 8 is an enlarged end view of one of the cutter teeth, the tooth being modified to a straight tooth type in order to illustrate more effectively the geometrical configuration of the cutting edge structure.

In Fig. 4 there is shown a continuous tooth herringbone gear G having integrally joined helical tooth sections 10, 11. For future reference, the flanks 10a, 11a of the sections which meet to form an interior angle A will be termed the interior flanks, while the opposing flanks 10b, 11b, will be referred to as exterior flanks. As is well known in the art, the apices defined by the meeting flanks accurately define the median plane of the gear.

In the machining of such gears, a pair of pinion type cutters are reciprocated in a path parallel to the axis of the gear, and they and the gear are rotated as if in mesh. The cutters are given an additional helical twisting movement during this process, so that they cut helical formations in the gear. Inasmuch as this process is well known, a lengthy description is not necessary, reference being made to the Sykes machine patent No. 2,010,970. A cutter 15 of this general type is shown in Fig. 1, and it is formed with helical cutting teeth 16 adapted to fashion the right hand tooth sections 10 of the gear of Fig. 4. A single tooth 16a of the left hand cutter 15a is also shown in the latter view, and it will be understood that the left hand cutter is identical, but of opposite hand, to the cutter 15.

Referring to Fig. 5, a pair of gears G are shown in mesh, with the lower gear being the driver and rotating in the direction indicated by the arrow. Inasmuch as herringbone gears are not reversible, as in the case of spur or single helical gears, it will be apparent that the only manner in which they may be meshed is with interior flanks of one gear in opposition to exterior flanks of the other gear. In the present invention it is not proposed to alter the contour of the flanks 10a, 11a, and thus they are formed to as nearly perfect involute surfaces as is permitted by this process. The exterior flanks 10b, 11b, are modified by causing the contour to fall within the true involute. In Fig. 5, for example, the involute which would bring the exterior flanks into symmetry with the interior flanks is indicated by the dotted lines 20, while the adjacent full lines indicate the manner in which the exterior flanks are actually cut. It will be noted that the chordal thickness of the tooth at the pitch line P is unaltered and that the modification increases at substantially a uniform rate toward the tooth tip and root. For illustrative purposes, this flank relief is greatly exaggerated, as its actual departure from a true involute may not be more than .0004 inch at the tip in 3 D. P. gears.

It will be understood that the tooth contacts A, B (Fig. 5), are taken at one face of the herringbone gears, and that different phases of engagement not practical to illustrate are obtained from this face inward to the medial plane of the gears. No attempt is made in this view to illustrate the total line contact, which line contact is better shown in the supplementary diagrammatic illustration of Fig. 7.

In the operation of meshing gears formed as above described, reference is made to Fig. 7, where the lines of contact A, B and C of Fig. 5 are shown in a development of the three teeth in mesh. In this view, the heavy lines A, B, C indicate the lines of contact which would be made if the gears of Fig. 5 were operated under a very light load and without lubricant. Obviously, under these conditions, tooth deflections and metal compression would be at a minimum, and as a result the zone of contact (as may be indicated by the weight of these lines) would be largely at the pitch line of the gears.

Under practical conditions, where the gears G transmit the normal horsepower for which they are designed, it will be apparent that tooth deflections will be more pronounced. It has been found that this, plus the presence of a lubricant film, compensates for the deliberate deformation of the exterior flanks 10b, 11b, to the end that an oblique line contact (A', B', C') is obtained, of the desired theoretical characteristic. As a result, pressures are distributed substantially uniformly across each tooth from the tip to the working depth line as it passes through the active working phase.

The helical cutters 15, 15a are devised to produce Sykes type herringbone gears having teeth formed according to this principle. Each tooth of the cutter 15 is of true involute shape and each tooth is tapered from its cutting face 21, as indicated at 22 in Fig. 6, to provide tool relief on tip, root, and both flanks. The forward or acute edge of each tooth is ground back at an angle to form a facet 25, which defines a cutting edge 26 with the adjoining flank 27. This edge is disposed so that it coincides with a plane Y (Fig. 6), parallel to the cutting face 21, and thus it is a true reflection of the involute formation of the tooth. As shown in Fig. 4, the flank edge 26 cuts the previously mentioned inside flank 10a of the gear tooth 10, and being formed as mentioned, it is capable of cutting cleanly and precisely to the inside apex of the tooth formation.

An angular groove 28 is cut into the opposite side of the tooth, and its outside facet 28a and the adjoining tooth flank 31 form a second flank cutting edge 30. The bottom or apex 28b of the groove runs out precisely at the tooth corner C, so that the tip of the tooth, which bears the brunt of the cutting action, is entirely free of weakening cuts or elaborate formations. As will be observed in Figs. 2 and 6, this edge differs in that it is curved relative to the plane of the edge 26, and thus it is concave relative to the face 21 of the cutter (Fig. 6). The low point of such curve relative to the plane Y is near the center of the tooth, and preferably it is very slightly spaced from, or tangent to said plane, as indicated by the dimension X (Fig. 6). Thus, one point on the curved edge 30 approaches or coincides with the plane of the edge 26, while the remaining portions curve outward harmoniously toward the tip and root of the cutter tooth.

In Fig. 8, a cutter tooth 16 is illustrated diagrammatically in end elevation. The tooth 16 is shown as a straight rather than a helical tooth, as an aid in understanding the three-dimensional effect of the intersecton of the curved edge 30 with the tapered flank 31 of the tooth. The dot and dash line 30a indicates how the edge 30 would appear if it were formed in true symmetry with the edge 26. In such case, the edge 30a would obviously coincide with the previously mentioned plane Y. When the edge is curved, according to the preceding description, it will be seen when the tooth is viewed from the end that only the central or pitch line portion of the edge 30 approaches the plane of the edge 26, while the remaining portions lie exterior of the true involute 30a. Obviously, if the tooth were not tapered, this development would not be possible. Thus, advantage is taken of this natural cutter tooth structure to obtain by simple means a deliberate deviation on one flank from the true involute form.

The face of the cutter tooth is formed with an additional facet 32 near the tooth tip, and as best shown in Fig. 2, it will be apparent that it may be ground by a conical or cylindrical wheel to a concave shape. This facet, in conjunction with the tip surface 33 of the tooth, defines the top cutting edge 34, and it is disposed to coincide precisely with the extremity of the flank edge 30 and tooth corner 29. It will be observed that the edge is angular relative to the face plane, and that it extends to a point just adjacent to the edge 26.

The facets 25, 28a, 32 are disposed at cutting angles of somewhat less than ninety degrees relative to their adjoining profile surfaces to provide the best suited cutting actions. The groove 28 additionally provides proper chip disposal for its cutting edge, and it will be apparent that it may be formed in various other shapes, provided the previously described location and form of the cutting edge is retained. In Fig. 3, for example, a groove 40 is formed in toric shape, converging toward the corner 41. As in the first embodiment, the edge 42 is curved during this process so that its low point 42a lies adjacent to the plane of the opposing flank edge 43.

When the teeth of the cutter become dull through constant usage, they are resharpened to the identical proportions described by the application of suitable grinding wheels. It will be apparent that the sharpening process, due to the simple formations of the facets, is easily accomplished, and the cutting edges may be directly and accurately checked by suitable gages.

The invention relating to the gear tooth is described in conjunction with a continuous tooth double helical gear. However, it will be obvious to those skilled in the art that certain of its features may be used in herringbone gears of other types. Similarly, the cutter, although best suited to cut Sykes type gears, may readily be used to shape other types of herringbone gears.

We claim:

1. A cutter of the pinion type for producing double helical gears comprising tapered teeth of involute profile having cutting faces, each cutting face being formed with a ground facet adjacent the acute flank of the tooth to define a cutting edge, said edges lying in a plane parallel to the cutter face, a groove in each tooth face adjacent the obtuse flank and defining with said obtuse flank a second cutting edge, said second cutting edge being curved relative to said plane and concave relative to the tooth face, said last edge being substantially tangent to said plane at approximately the pitch line of the cutter.

2. A cutter of the pinion type for producing double helical gears comprising teeth having cutting faces each formed with a ground facet adjacent the acute tooth flank defining a cutting edge, a groove in each tooth face adjacent the obtuse flank and defining with said obtuse flank a second cutting edge, and a facet cut in the face of each tooth adjacent the tip thereof, said last facet and said groove terminating at the obtuse corner of the tooth.

3. A cutter of the pinion type for producing double helical gears comprising teeth having cutting faces each formed with a ground facet adjacent the acute tooth flank defining a cutting edge, a groove in each tooth face adjacent the obtuse flank and defining with said obtuse flank a second cutting edge, said groove terminating at the corner of the tooth tip, a facet cut in the face of each tooth adjacent the tip thereof, said last facet being concave in shape and terminating also at said corner.

4. A cutter of the pinion type for producing double helical gears comprising teeth having cutting faces each formed with an angular facet adjacent the acute tooth flank defining a cutting edge, a groove in each tooth face adjacent the obtuse flank defining a second cutting edge, said groove terminating at the corner of the tooth tip, a facet cut in the face of each tooth adjacent the tip thereof and defining a substantially lineal tip cutting edge meeting said obtuse cutting edge at said corner.

5. A cutter of the pinion type for producing double helical gears comprising teeth of involute profile having cutting faces each formed with a ground facet adjacent the acute tooth flank defining a cutting edge, said edges lying in a plane parallel to the face of the cutter, a groove in each tooth face adjacent the obtuse flank and defining with said obtuse flank a second cutting edge, said edge terminating at the corner of the tooth tip, said second cutting edge being curved and concave relative to said tooth face and being substantially tangent to the plane of said first edge, and a facet disposed in each tooth face adjacent the tooth tip, said last facet defining a tip cutting edge and terminating at said corner.

HARRY E. KITCHEN.
GUSTAVE H. HEDMAN.